March 29, 1966     H. F. KEATES     3,243,214
TWINE TYING MECHANISM
Filed March 10, 1964     3 Sheets-Sheet 1
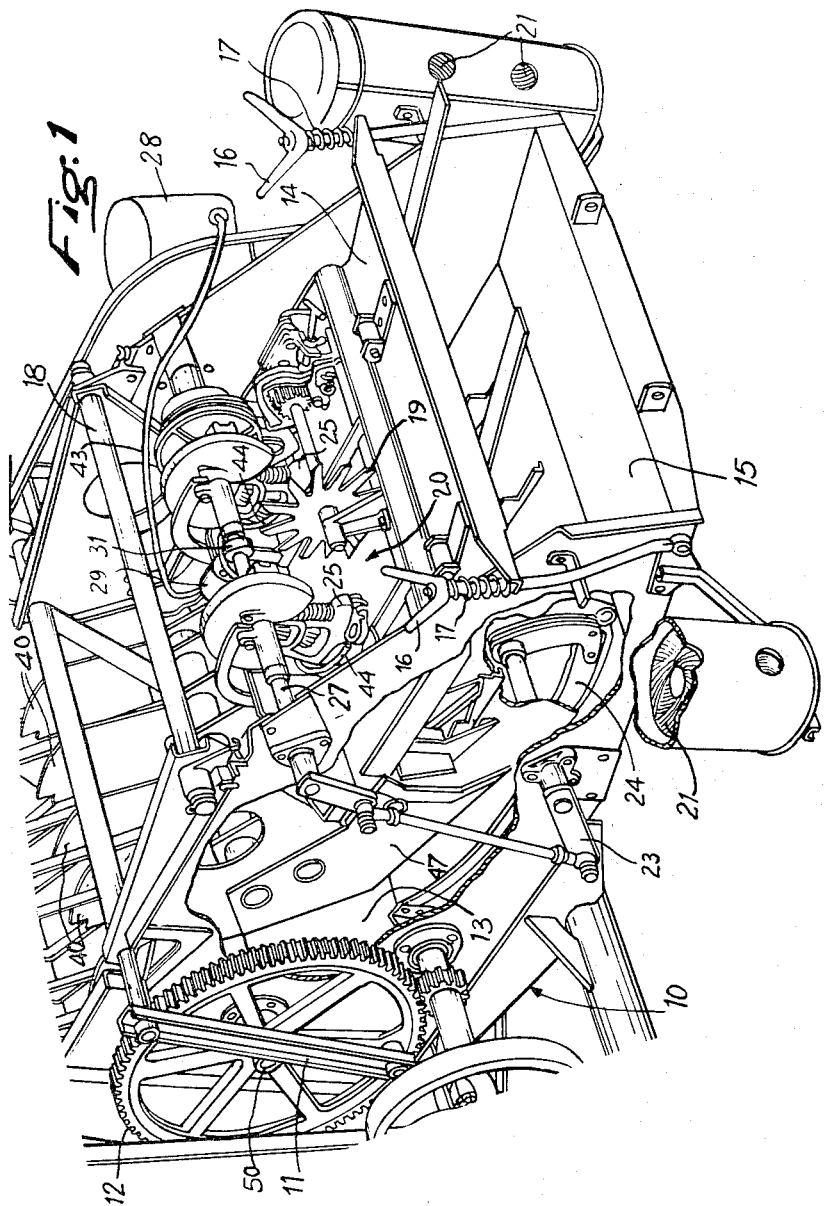
INVENTOR
HENRY F. KEATES
BY *Ralph Alvey*
ATTORNEYS March 29, 1966   H. F. KEATES   3,243,214
TWINE TYING MECHANISM
Filed March 10, 1964   3 Sheets-Sheet 2
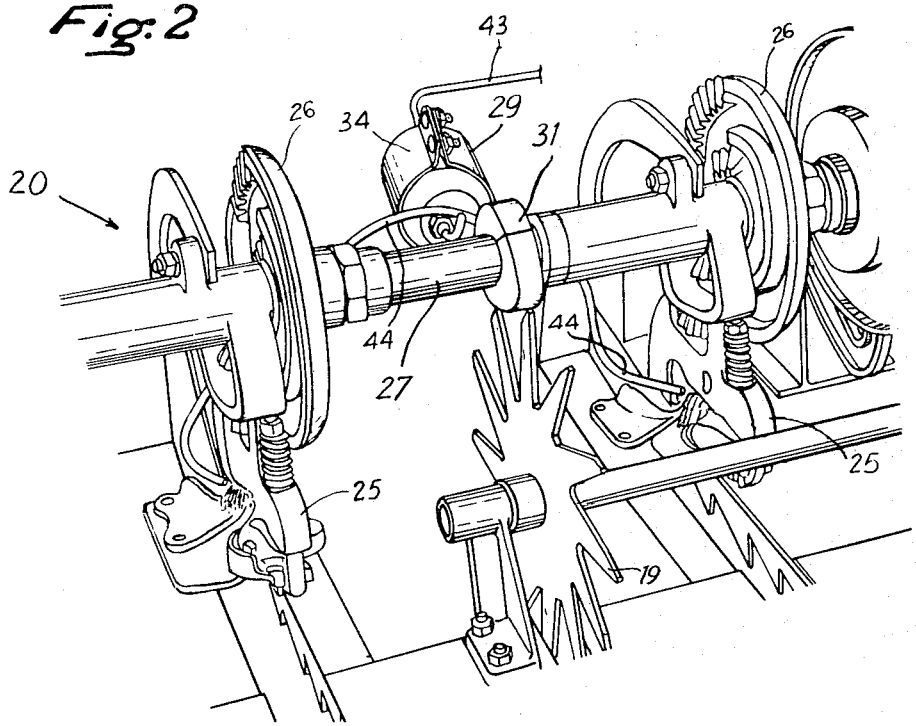
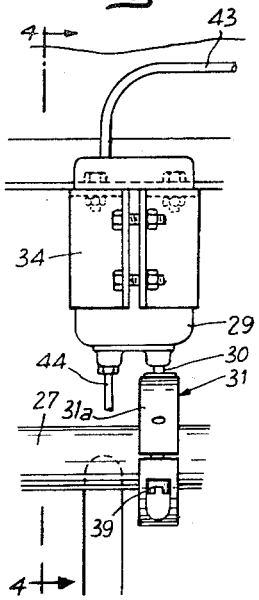
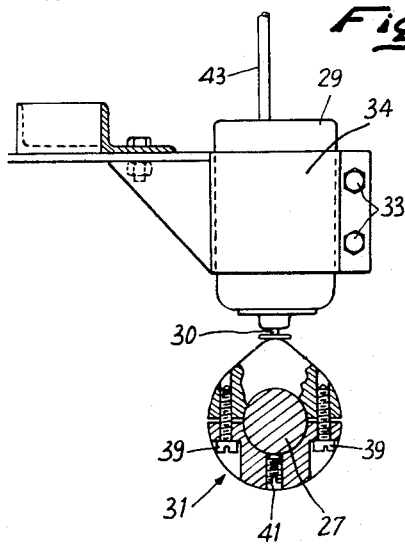
INVENTOR
HENRY F. KEATES
BY Ralph Alvey
ATTORNEYS March 29, 1966 H. F. KEATES 3,243,214
TWINE TYING MECHANISM Filed March 10, 1964 3 Sheets-Sheet 3

Inventor
Henry F. Keates
Ralph Alvey
Attorney

United States Patent Office 3,243,214
Patented Mar. 29, 1966

3,243,214
TWINE TYING MECHANISM
Henry F. Keates, 50 Rue Jean Jauris, Croix-Nord, France
Filed Mar. 10, 1964, Ser. No. 350,831
4 Claims. (Cl. 289—2)

This invention comprises a new and improved twine-tying mechanism for a baler, more particularly, a twine knotter that produces stronger knots by wetting the twine as each knot is tied.

While prior art twine-tying mechanism produce defective knots less than one percent of the time, the few "misses" that still occur are a nuisance because they allow bales to break up and scatter about the field. Needless to say, scattered bales reduce the efficiency of the baling operation, since they must be cleaned up by hand.

Defective knots sometimes result from slippage of the twine, which occurs when the baled material expands and pulls the knot apart. It is an object of this invention, therefore, to provide a twine-tying mechanism for tying a knot that is less apt to be pulled apart when subjected to large tension forces. This object is achieved by means of a pump that wets each knot during the final stages of its formation.

A twine-tying mechanism embodying the present invention is shown in the accompanying drawings, where:

FIG. 1 is a perspective view of a hay baler, showing the location thereon of the invention;

FIG. 2 is a perspective view of the knotter and the twine wetting mechanism;

FIG. 3 is a plan view of the pump and drive cam of the twine wetting mechanism;

FIG. 4 is a partial cross-section of the pump and drive cam, taken on line 4—4 of FIG. 3;

Figure 5:
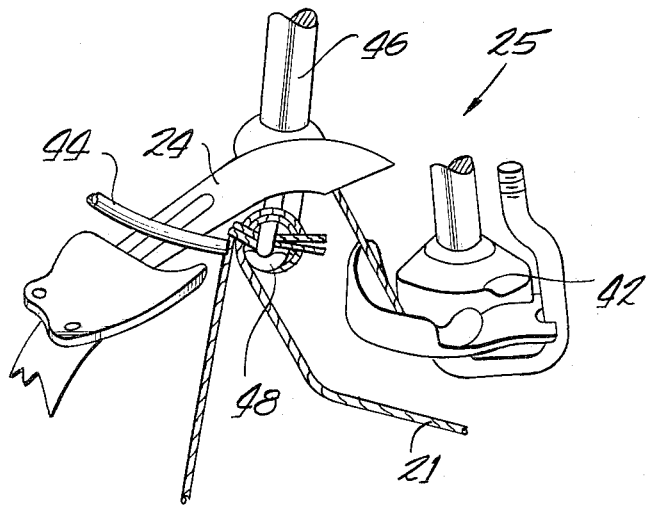
FIG. 5 is a perspective view of the knotter mechanism showing one suitable stage at which the knot may be wetted.

The hay baler 10 of FIG. 1 is an in-line baler of Europpean design, that is, hay passes through the baler from its inlet (not shown) to outlet 15 in a straight path. Hay is gathered from the ground by a rotary pickup mechanism (not shown) at the front end of the baler and fed into the path of the blades 40 rotating on shaft 50. Rotary blades 40 then push the hay rearwardly into the baling chamber 13, where plunger 47, pivoted on shaft 18 and oscillated by crank 11 on bull gear 12, packs the hay into a bale. The density of the bales is controlled by the movable top sheet 14 of the bale chamber, which is adjusted by nuts 16 and springs 17. Each bale is bound with twine by means of the twine tying mechanism 20, described below.

Twine tying mechanism 20 (FIGS. 2, 5 and 6), a twin needle mechanism, works in the following manner: When the bale of hay reaches proper length, metering wheel 19 actuates a clutch (not shown) that connects drive shaft 27, drive gear 26, and needle drive 23 to a source of power. Shaft 27 actuates needle drive 23 to swing both needles 24 upward through bale chamber 13 to deliver the tail ends of twine 21 to cord holders 42, thereby completing the loops of twine around the bale. Shaft 27 continues to rotate, so that on receipt of the tail ends of twine 21 by cord holders 42, drive gears 26 have advanced to the point where they actuate the bill hooks 46 to tie knots in the two loops of twine encircling the bale. During the return stroke of needles 24 (FIG. 5) to their home positions, needles 24 lay new strands of twine across bale chamber 13 for binding the next bale of hay. The finished and bound bale of hay is pushed out of baler discharge 15 by the forces generated by plunger 47 in forming the next bale of hay.

As described above, twine tying mechanism 20 is representative of the prior art (e.g. U.S. Patent No. 865,754). Described below is the knot wetting component of twine tying mechanism 20 forming the improvement over the prior art.

The novel means for wetting knots comprises a liquid reservoir 28 (FIG. 1), a piston-type pump 29 (FIGS. 1–4) for applying fluid to the knots, and a cam 31 (FIGS. 1–4) on shaft 27 for reciprocating the piston 30 of pump 29. Cam 31 rotates on shaft 27 in unison with the knotter drive gears 26 and the needle drive 23 and is synchronized with these elements to discharge liquid (preferably a mixture of water and soluble oil) onto each knot during the final stages of its formation.

Pump 29 is supported by bracket 34 and is connected to fluid reservoir 28 by a suction line 43. Fluid is discharged through the lines 44, that terminate adjacent the knotters 25. Pump plunger 30 is positively driven on its discharge stroke by cam 31 and reaches the dead-center of that stroke when acted on by the apex of cam 31 (FIG. 4). A spring (not shown) moves plunger 30 outward on its suction stroke (forcing plunger 30 against cam 31) to draw liquid into pump 29 from reservoir 28 through suction line 43 (FIG. 2).

Cam 31 is angularly adjustable on shaft 27 in order to synchronize the action of plunger 30 with the tying of the knot. To vary the position of cam 31 on shaft 27, the screws 39 and 41 (FIG. 4) holding cam 31 on the shaft 27 are loosened and the cam then repositioned as desired.

Figure 6:
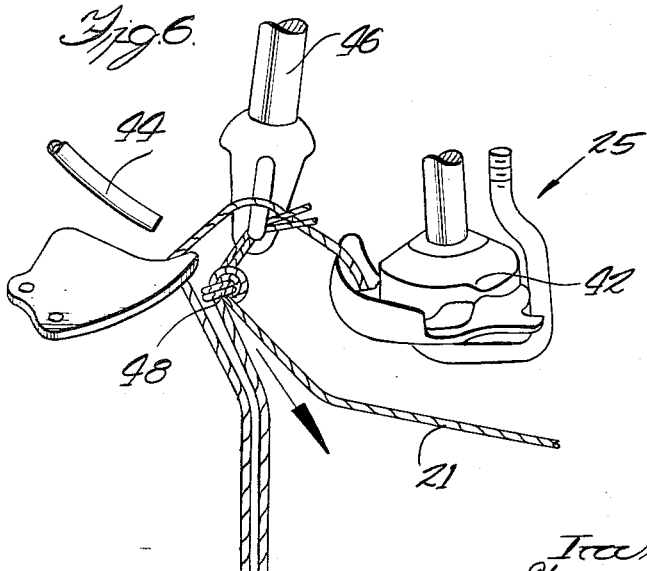
FIGURE 6 is a perspective view of the knotter mechanism showing another suitable stage at which the knot may be wetted.

Preferably, cam 31 should be synchronized so that pump 29 discharges fluid on the knot during the final stages of its formation (FIGS. 5–6), since at this time the knot presents a relatively stationary target for the fluid. Thus, cam 31 can be set so that pump 29 discharges fluid on the knot as billhook 46 completes its rotation and needle 24 descends on its return stroke (FIG. 5). Or, cam 31 can be set so that pump 29 discharges as the knot leaves billhook 46 (FIG. 6). Be that as it may, by thoroughly wetting the knot, a tighter knot, one less likely to come undone, is produced.

In the foregoing description, a new and improved twine tying mechanism has been presented. The invention is not, however, limited to the exact embodiment shown but embraces, as well, all equivalent forms that fall within the spirit and scope of the attached claims. For example, a rotary vane or rotary piston-type pump could be installed on shaft 27 in lieu of the reciprocating piston pumps 29 shown. Or, the knotter mechanism of U.S. Patent No. 3,101,963 could be substituted for the one shown herein.

The invention claimed is:

1. A twine-tying mechanism, comprising: a twine knotter mechanism for tying a knot, a rotary drive shaft for said knotter mechanism operably associated therewith, a pump for discharging fluid onto said knot during a final stage of its formation, said pump comprising a pump cylinder, a piston reciprocable in said cylinder, and means for reciprocating said piston in synchronization with said knotter mechanism operably associated with said piston and said drive shaft.

2. A twine-tying mechanism, comprising: a twine knotter mechanism for tying a knot, a rotary drive shaft for said knotter mechanism operably associated therewith, a pump for discharging fluid onto said knot, said pump comprising a pump cylinder with a fluid inlet and a fluid outlet, a piston reciprocable in said cylinder, a cam on said drive shaft engaging said piston, said cam being synchronized with said knotter mechanism to drive said piston on its discharge stroke during a final stage of the formation of said knot, a fluid supply reservoir, a fluid conduit connecting said reservoir to said fluid inlet of said pump, a fluid conduit connected to said fluid outlet of said pump and terminating adjacent said knotter mechanisms.

3. A tying mechanism for binding material, comprising: a knotter mechanism for forming a knot in said binding material, a pump including a pumping chamber having a fluid inlet and a fluid outlet, a pumping member movable in said pumping chamber on a fluid discharge stroke, a fluid discharge conduit from said fluid outlet for directing fluid discharged by said pump to the vicinity of said knotter mechanism, power supply means for said knotter mechanism and said pump, actuating means for said knotter mechanism connected to said power supply means and including means for temporarily connecting said power supply means to said knotter mechanism to drive said knotter mechanism through a knot-forming cycle, and actuating means for said pump driven by said power supply means for driving said pumping member on said fluid discharge stroke when said knotter mechanism is driven through said knot-forming cycle, whereby said pump discharges fluid on said knot during formation thereof to increase the strength thereof.

4. A tying mechanism as recited in claim 3, wherein: said actuating means for said knotter mechanism includes a rotary drive shaft, said pumping chamber is a cylinder, said pumping member is a piston, said actuating means for said pump is a cam on said rotary drive shaft synchronized with said knotter mechanism to drive said piston on said fluid discharge stroke when said knotter mechanism is driven through said knot-forming cycle.

References Cited by the Examiner
UNITED STATES PATENTS

| 865,754 | 9/1907 | Benjamin | 289—13 |
| 2,246,217 | 6/1941 | Noling | 289—2 |
| 3,052,565 | 9/1962 | Chinn et al. | 117—37 |
| 3,101,963 | 8/1963 | Sullivan et al. | 289—11 |

DONALD W. PARKER, *Primary Examiner.*

L. K. RIMRODT, *Assistant Examiner.*